United States Patent
Henry et al.

(10) Patent No.: US 8,144,843 B2
(45) Date of Patent: *Mar. 27, 2012

(54) SYSTEM AND METHOD FOR ACCESSING A MESSAGING SERVICE USING A SHORT DIALING SEQUENCE

(75) Inventors: Tricia Ehlers Henry, Bartlett, IL (US); Victor Piollet Mills, Jr., Woodlands, TX (US); Margaret Jean Andrietsch, Racine, WI (US); Diana Inara Tiliks, Elk Grove, IL (US); Rodney T Brand, Lisle, IL (US); Carlos H Donoso, Bartlett, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/490,728

(22) Filed: Jun. 24, 2009

(65) Prior Publication Data
US 2009/0257570 A1 Oct. 15, 2009

Related U.S. Application Data

(63) Continuation of application No. 10/775,831, filed on Feb. 10, 2004, now Pat. No. 7,567,655, which is a continuation of application No. 10/138,045, filed on May 3, 2002, now Pat. No. 6,718,018, which is a continuation of application No. 09/052,480, filed on Mar. 31, 1998, now Pat. No. 6,453,018.

(51) Int. Cl.
*H04M 1/64* (2006.01)

(52) U.S. Cl. ...... 379/88.22; 379/69; 379/82; 379/88.03; 379/201.11; 379/216.01; 379/355.08

(58) Field of Classification Search .................. 379/67.1, 379/69, 82, 88.03, 88.22, 207.11, 216.01, 379/88.04, 88.08, 88.17, 88.18, 88.25, 201.02, 379/211.02, 212.01, 355.07, 355.08
See application file for complete search history.

(56) References Cited

U.S. PATENT DOCUMENTS

| | | | |
|---|---|---|---|
| 5,182,766 A | 1/1993 | Garland | |
| 5,259,026 A | 11/1993 | Johnson | |
| 5,272,748 A | 12/1993 | Davis | |
| 5,278,897 A | 1/1994 | Mowery et al. | |
| 5,325,421 A | 6/1994 | Hou et al. | |

(Continued)

OTHER PUBLICATIONS

Ekstrom, Gayle: "The Advanced Intelligent Network", *Midwest Engineer*, pp. 2-5, 28; Mar./Apr. 1995.

(Continued)

*Primary Examiner* — Md S Elahee

(57) ABSTRACT

A system and method for providing easy access to messaging services in a telecommunications network having office switches that are used by different providers of telephone and messaging services. The system uses a supplementary services database to maintain customer records including whether the customer uses messaging services and whether the customer subscribes to a short dialing sequence service for access to the messaging services. The customer is connected to the central office switch, which analyzes the dialing sequences generated by the customer. When the customer attempts access to the messaging services, the customer dials a short dialing or message sequence, such as *XX. The central office switch triggers a query to the supplementary services database for a call forwarding number to the messaging service used by the customer when the selected short dialing sequence is recognized by the switch. When the central office switch receives the call forwarding number, the number is used to route the customer to the messaging service.

17 Claims, 4 Drawing Sheets

U.S. PATENT DOCUMENTS

| | | | |
|---|---|---|---|
| 5,333,180 | A | 7/1994 | Brown et al. |
| 5,418,844 | A | 5/1995 | Morrisey et al. |
| 5,465,295 | A | 11/1995 | Furman |
| 5,493,607 | A | 2/1996 | Arumainayagam et al. |
| 5,524,146 | A | 6/1996 | Morrisey et al. |
| 5,553,130 | A | 9/1996 | Turner |
| 5,586,177 | A | 12/1996 | Farris et al. |
| 5,680,442 | A | 10/1997 | Bartholomew et al. |
| 5,692,033 | A * | 11/1997 | Farris ............... 379/67.1 |
| 5,703,940 | A | 12/1997 | Sattar et al. |
| 5,809,114 | A | 9/1998 | Solomon et al. |
| 5,835,583 | A | 11/1998 | Hetz et al. |
| 5,839,064 | A | 11/1998 | Foti |
| 6,044,259 | A | 3/2000 | Hentila et al. |
| 6,122,510 | A | 9/2000 | Granberg |
| 6,181,787 | B1 | 1/2001 | Malik |
| 6,201,950 | B1 | 3/2001 | Fuller et al. |
| 6,215,857 | B1 | 4/2001 | Kasiviswanathan |
| 6,718,018 | B2 | 4/2004 | Henry et al. |

OTHER PUBLICATIONS

Brochure: "Home Voice Mail; Attention Maryland Home Voice Mail Customers."

* cited by examiner

SYSTEM AND METHOD FOR ACCESSING A MESSAGING SERVICE USING A SHORT DIALING SEQUENCE

RELATED APPLICATIONS

The present application is a continuation of U.S. patent application Ser. No. 10/775,831, filed Feb. 10, 2004, now U.S. Pat. No. 7,567,655, which is a continuation of U.S. patent application Ser. No. 10/138,045 (now U.S. Pat. No. 6,718,018), filed May 3, 2002, which is a continuation of U.S. patent application Ser. No. 09/052,480 (now U.S. Pat. No. 6,453,018), filed Mar. 31, 1998, the entirety of each of which are hereby incorporated by reference.

BACKGROUND

A. Field of the Invention

The present invention relates to telecommunications services, and more particularly to a method and system for efficiently accessing messaging services.

B. Description of Related Art and Advantages of the Invention

Telephone answering devices (TAD) such as message answering machines have become a popular way for users of telephone subscribers to retrieve messages left by callers who have called while no one was available to answer the telephone. Once the message answering machine is setup, its easy to use. By pressing a button, a user can play any messages left by callers.

The problem with such a TAD is that callers are not able to leave messages while another caller is already leaving a message. In addition, callers cannot leave messages while the subscriber is using the telephone. The caller receives a busy signal unless the called party subscribes to a "call-waiting" service. If the called party subscribes to a call-waiting service and is on the telephone when another call comes in, the caller would get a ring. The TAD, however, is still not able to record a message. The TAD may therefore be inadequate for recording messages particularly in business environments in which a subscriber may receive a large number of telephone calls.

Alternatives TAD are available in most office environments. A popular alternative is a voice mail system allowing subscribers to receive messages in voice mailboxes. Voice mail systems allow subscribers to receive, edit and forward messages to one or more mailboxes within the voice mail system.

Voice mail systems are available as stand-alone or integrated systems. Stand-alone systems are similar to answering machines except that the voice mailboxes communicate with one another to make it possible to forward messages from one voice mailbox to another. Integrated voice mail systems typically connect a caller to the called party's mailbox after a certain number of rings. Integrated voice mail systems are preferred because they can provide the capability of receiving messages while the phone is being used, or even while another caller is leaving a message.

Initially, voice mail systems were implemented in private branch exchanges (PBX) or other telephone systems local to the users. Telecommunications service providers also offer messaging services or the capability of making third-party messaging services available to its subscribers. The subscribers may subscribe to the voice mail service and receive a special telephone number for accessing the customer mailbox. Early messaging services were typically implemented in local switches. Some providers use a voice messaging platform supplied by the telecommunications provider or by a third-party to offer messaging services. The voice-messaging platform contains voice mailboxes to which callers are connected when a called telephone number goes unanswered. The voice-messaging platform is also accessible to subscribers via the telephone number for voice mail. The user may access the voice mailbox to which it is assigned from any telephone in the network.

The advantage of using the messaging services provided by telecommunications service providers is that it makes voice mail available to all customers and not just to organizations or businesses having a local voice mail system. Furthermore, the voice mail system provided by the telecommunications service providers will connect a caller to a voice mailbox even when the telephone is being used.

One problem with the voice mail system provided by service providers is that a user must dial either a 7 or 10 digit telephone number to access and retrieve messages. This is inconvenient to customers who would prefer the ease of simply pressing one button on the answering machine.

It would be desirable to provide a voice mail service that will permit the customer to access messages with a dialing sequence that is shorter than a full telephone number.

Some switch-based voice mail systems permit a customer to access messages using a two or three digit sequence. Switch-based systems, however, are not practical in a multi-vendor telephone network. Telephone switches in the United States and other multi-vendor networks must provide access to different service providers.

It would be desirable to provide a voice mail service that is not switch-based and that permits access to mailboxes using a short dialing sequence.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE DRAWINGS

Figure 1:
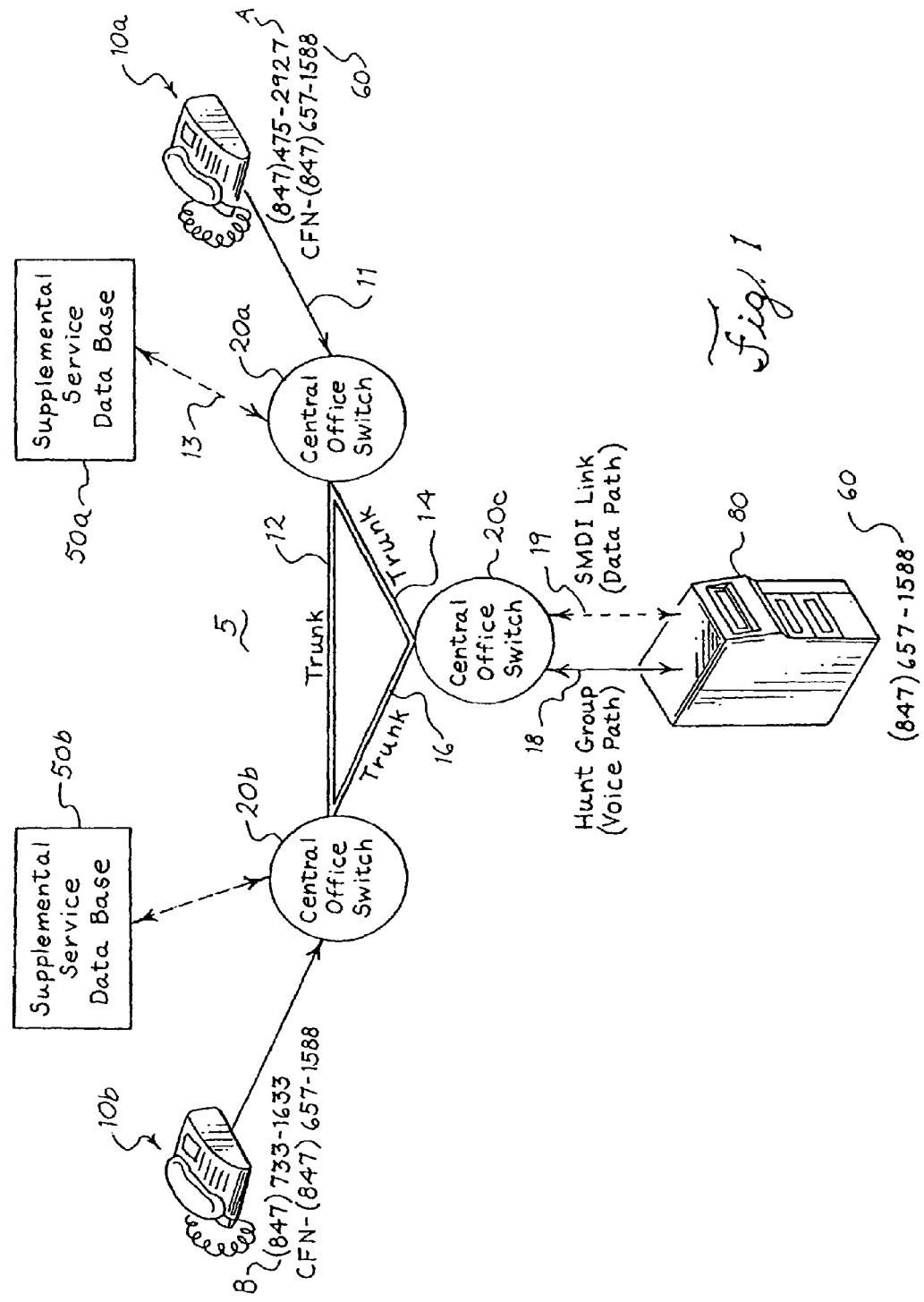
FIG. 1 is a block diagram of a voice mail system in a telecommunications network in which the present invention finds particular use.

FIG. 1 is a block diagram of a messaging system 5 in a telecommunications network according to an aspect of the present invention. The messaging system 5 includes a first and second customer premises equipment (CPE) 10a-b, a first, second and third central office switch 20a-c, a supplementary service database 50, and a messaging services platform 80. The message system 5 in FIG. 1 implements messaging services, such as voice mail services, for any subscriber or user connected to the telecommunications network through a telecommunications device, such as, for example, the CPE's 10a-b. The messaging services system 5 advantageously provides access to messaging services using a short dialing or messaging sequence while permitting the use of switches 20 provided by different vendors. A short dialing sequence may include any sequence of n characters and digits where n is less than 7.

The star-code access service permits the user to access voice mail by pressing the * (star key) and any selected sequence of digits fewer than six. For example, a two digit sequence following the * (star key), i.e. *XX, may be dialed from the user's CPE 10 to access voice mail. In a preferred embodiment, a user may subscribe to the star-code access service in addition to or in conjunction with a messaging service, such as voice mail. Alternatively, a user may obtain the star-code access service with the messaging service.

The CPE's 10a-b are typically telephones having a keypad that is capable of generating dual-tone multiple frequency (DTMF) tones for dialing and signaling. The CPE 10a is one of many CPEs that access the telecommunications network via the first central office switch 20a. Users of telephone service providers have CPEs 10a-b with telephone numbers A and B assigned to them. The CPE 10a connects to the first central office switch 20a using a circuit at connection 11 the details of which are known by those skilled in the art. The central office switch 20a to which the CPE 10a is connected may identify the CPE by the telephone number at A.

The central office switch 20a switches calls to and from the CPE 10a and other telecommunications devices to which it is connected. The central office switch 20a may also be provisioned to perform other services as is well known in the art. When the user at CPE 10a lifts the telephone set off the hook, or otherwise closes the circuit at connection 11 and begins to dial a destination telephone number, the central office switch 20a identifies the telephone number A of the CPE 10a and analyzes the destination telephone number. If the destination telephone number is one that initiates one of the services for which the central office switch 20a is provisioned, the steps for performing the service are started. Otherwise, the central office switch 20a routes the call to the destination telephone number. In a preferred embodiment, the central office switch 20a uses a signal transfer point (STP) to route calls. Switches that may be used for the central office switches 20a-c include the 5ESS7 made by Lucent and the DMS-100 made by Northern Telecom.

The central office switch 20a is connected to all other switches in the system via voice and signal trunk lines such as trunk lines 12, 14, 16.

The central office switch 20a is connected to the supplementary service database 50a by connection 13. The supplementary service database 50a may be any database used by a service provider suitable for configuring and controlling the services to which users subscribe. For example, the user with the CPE 10a having telephone number A may subscribe to supplementary services such as call forwarding, caller ID or voice mail. The supplementary service database 20a includes a customer record identifying these services as those subscribed to by the user with telephone number A. In a preferred embodiment, the supplementary service database 50a includes the advanced intelligent network service control point (AIN SCP).

In a preferred embodiment, the central office switches a-c and the supplementary service database 50a-b operate according to the Signaling System #7 (SS7) protocol.

Messaging services platform 80 can be accessed from anywhere on the network using a call forwarding number 60. The messaging services platform 80 connects to the system via a data path 19 and a voice path 18. In a preferred embodiment, the messaging services platform 80 uses voice lines organized as a hunt group. For a data path, the messaging services platform 80 preferably uses a Signal Message Desk Interface (SMDI) circuit. Hunt groups and SMDI circuits are known in the art and require no further description. The messaging services platform 80 includes the mailboxes and other resources needed to perform, or to access the services needed to perform messaging services.

The operation of the messaging services performed by the messaging services platform 80 may depend on the service selected by the user. For example, a voice mail service may be provisioned in the central office switch 20a to connect the second user at CPE 10b to the mailbox of the first user at CPE 10a when no one answers the second user's call at the CPE 10a. The second user may leave the first user a message. To retrieve the message from a telecommunications device other than the CPE 10a, the user dials the call forwarding number 60 and, once connected, may enter a password, or some other personal identification number, to gain access to the mailbox. Typically, the user would have to dial the call forwarding number 60 from the CPE 10a to retrieve his messages. The advantage of the present invention is that, from the CPE 10a, the user need only dial a short dialing sequence, such as *XX, to retrieve messages from his mailbox.

Figure 2:
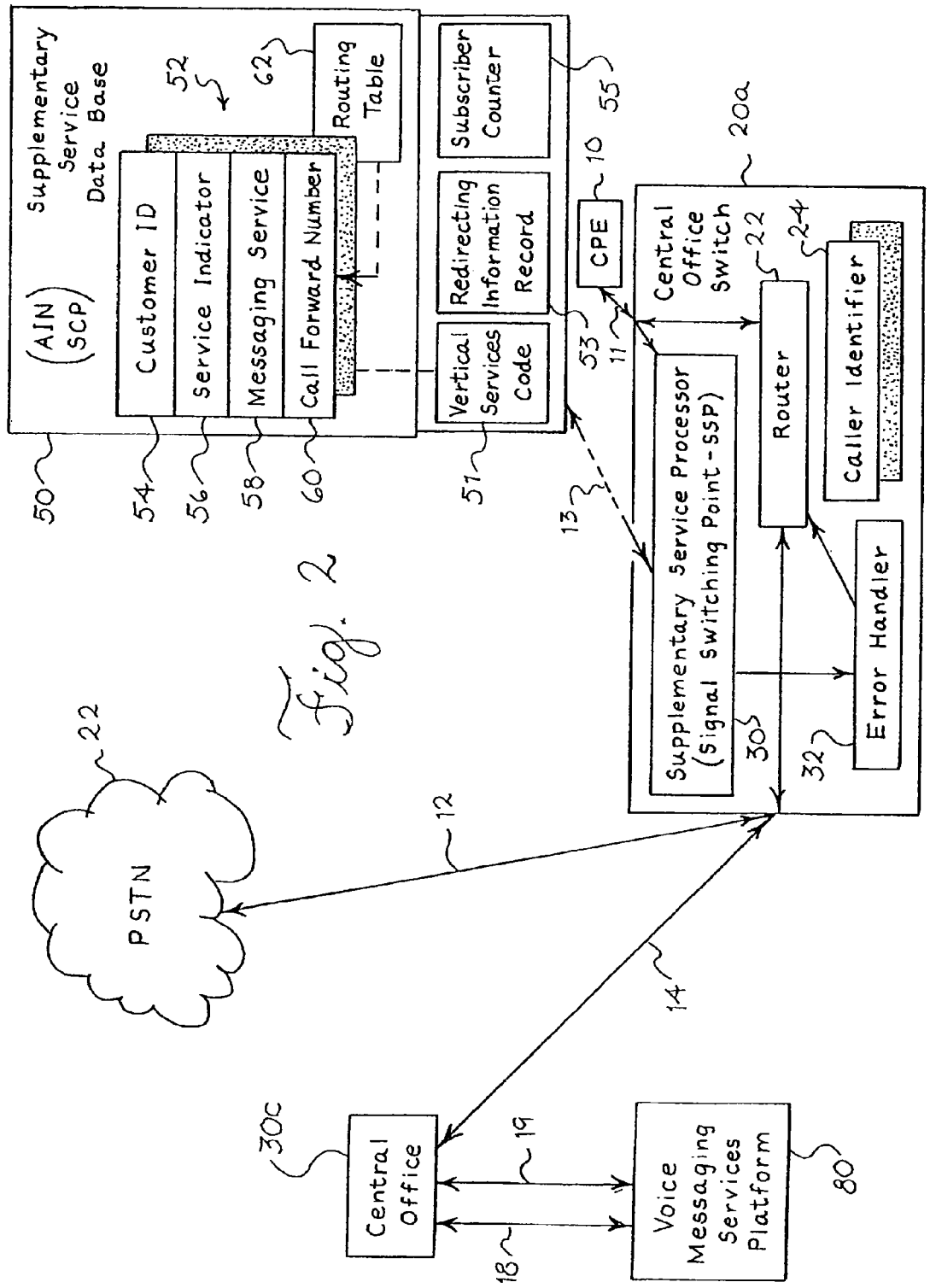
FIG. 2 is a block diagram of a preferred embodiment of the present invention.

FIG. 2 shows software and data structure in the system of FIG. 1 for providing a short dialing sequence access to messaging services. The central office switch 20a in FIG. 2 includes a router 22, a caller identifier 24, a supplementary service processor 30, and an error handler 32. In a preferred embodiment, the user uses a star code with two digits, "*XX," to access voice mail. Preferably, the user is required to subscribe to the star code access service.

The router 22 performs signaling functions for routing calls to and from the CPE 10. In a preferred embodiment, the router 22 is a signal transfer point (STP) that uses SS7 signaling.

The supplementary service processor 30 analyzes dialing sequences from the CPE 10 to determine whether access to a supplementary service for which the switch has been provisioned is being accessed. If a supplementary service is identified, the supplementary service processor 30 suspends call processing and initiates the service identified by the dialing sequence. The supplementary service processor 30 may require instruction from the supplementary service database 50. If instructions are required, the supplementary service processor 30 uses a caller identifier 24 to query the supplementary service database 50 to obtain instructions on how to initiate the service requested by the caller. In a preferred embodiment, the supplementary service processor 30 is an AIN SSP (service switching point). The AIN SSP 30 detects the star code access sequence as a public office dialing plan (PODP) trigger.

The error handler 32 may be invoked by the supplementary service processor 30 to handle errors associated with using supplementary services. For example, if a caller tries to use a service for which the caller has no subscription, the error handler is used to provide the proper feedback. The caller may dial a sequence that is identified by the supplementary service processor 30. To initiate service, the supplementary service processor 30 queries the supplementary service database 50 and, determines that the caller does not subscribe to the service requested. The supplementary service processor 30 will request that the error handler 32 send, for example, a recorded message notifying the caller that the attempted access to the service was not permitted.

The supplementary service database 50 includes at least one services code 51, a redirecting information record 53, a subscriber counter 55, a plurality of customer records 52, and a routing table 62.

The customer records 52 are data base records for the users that are connected to the central office switch 20. In a preferred embodiment, the customer records 52 include a customer identifier 54, an optional star code access service indicator 56, an optional voice mail service indicator 58, and a call forwarding number 60.

The services codes 51 may be used to determine if supplementary services are supported in a service area that access the supplementary services database 50. The supplementary services indicated by the services code 51 may include the star code access service. The star code access service may be processed by detecting the service, and then determining if the calling party subscribes to the service. In a preferred embodiment, the service code 51 includes the AIN vertical services code system to indicate whether the services to which any customer may subscribe include the star code access service.

If, during a query, the service code 51 indicates that the star code access service is available, the calling party number is used to determine if the caller subscribes to the star code access service.

The redirecting information record 53 may be used to shut down the star code access service at any time. The subscriber counter 55 may be used to count the number of times the service is accessed.

The customer identifier 54 may include any type of data element that identifies the customer. For example, the customer identifier 54 may include the name, social security number, customer identification number, telephone number or other any other suitable type of identification. The customer identifier 54 preferably includes the customer's telephone number.

The optional star code access service indicator 56 identifies whether the customer subscribes to the star code access service. The customer may subscribe to a variety of different services such as call forwarding, three-way calling, caller ID, etc. The optional voice mail service indicator 58 identifies whether the customer subscribes to a voice mail service and may include information that would provide instructions on the use of the voice mail service. For example, a password may be required, or other special steps may be necessary to use the service. The instructions may be provided to the switch 20 if any special processing is required of the switch 20. The optional star code access service indicator 56 and voice mail service indicator 58 are used in an alternative embodiment in which the supplementary services database 50 determines the calling party's records are accessed before determining the services to which the party subscribes.

The call forwarding number 60 is a number that the customer uses to access voice mail. The call forwarding number 60 is typically a 7 or 10 digit telephone number that a customer could use to dial in for voice mail messages from any telecommunications device. The call forwarding numbers 60 are preferably maintained in a routing table 62. In a preferred embodiment, the calling party's identifier is used to retrieve a call forwarding number from the routing table 62.

The customer records 52 in the supplementary service database 50 are preferably entered during normal customer service processing through a data entry system. For example, when a new customer orders service, a new customer record 52 is created using a menu or form driven user interface. The user interface may be located at any office of the service provider and have the ability to process customer records at any supplementary service database 50 in the provider's network. In a preferred embodiment, the supplementary service database includes the AIN service control point (SCP).

In a preferred embodiment, the central office switch 20*a* is provisioned for the star code access service. When the supplementary service processor 30 detects the selected sequence (for example, '*98'), the supplementary service processor 30 queries the supplementary services database 50 to determine whether the customer subscribes to the short dialing sequence access to voice mail service at connection 30. The query that is sent by the supplementary service processor 30 preferably includes the caller identifier 24. The supplementary services database 50 determines whether the star code access service is offered in the service area and then determines whether the calling party identified by the caller identifier 24 is a subscriber to the service. Alternatively, the supplementary service database 50 may search a plurality of customer records 52 for the customer record 52 that matches the caller identifier 24.

If the supplementary service database 50 finds that the caller subscribes to the star code access service, it forwards the call forwarding number for the service to the central office switch 20. The router 22 in the central office switch 20 uses the call forwarding number to connect the customer to the messaging services platform 80. Once connected, the messaging service platform 80 performs the necessary steps to enable the customer to access voice mail. The steps may include requesting and processing a password or other access code.

Figure 3A:
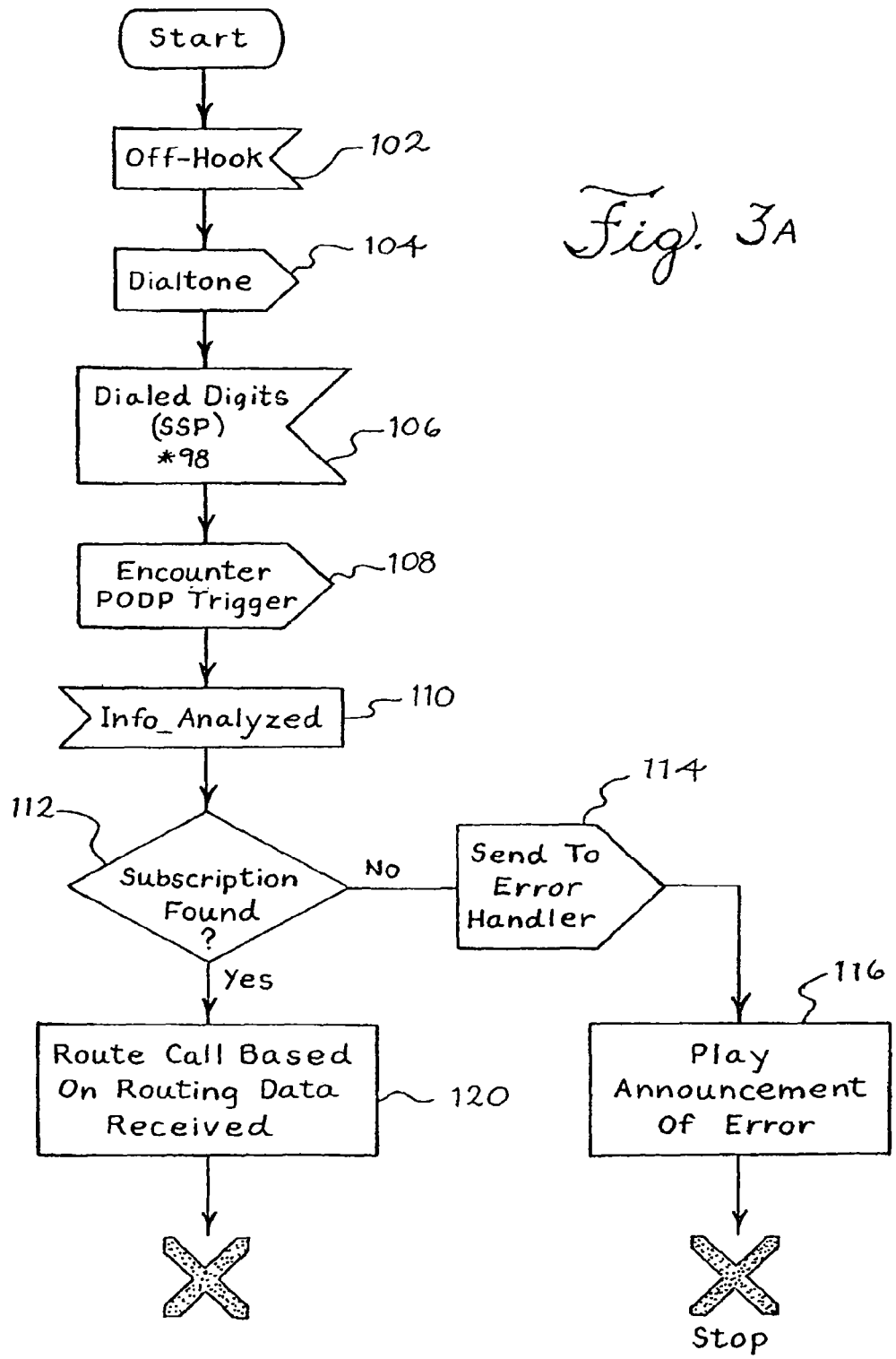
FIGS. 3A and 3B show a flow chart of a preferred embodiment of a described process for accessing messaging services.
Figure 3B:
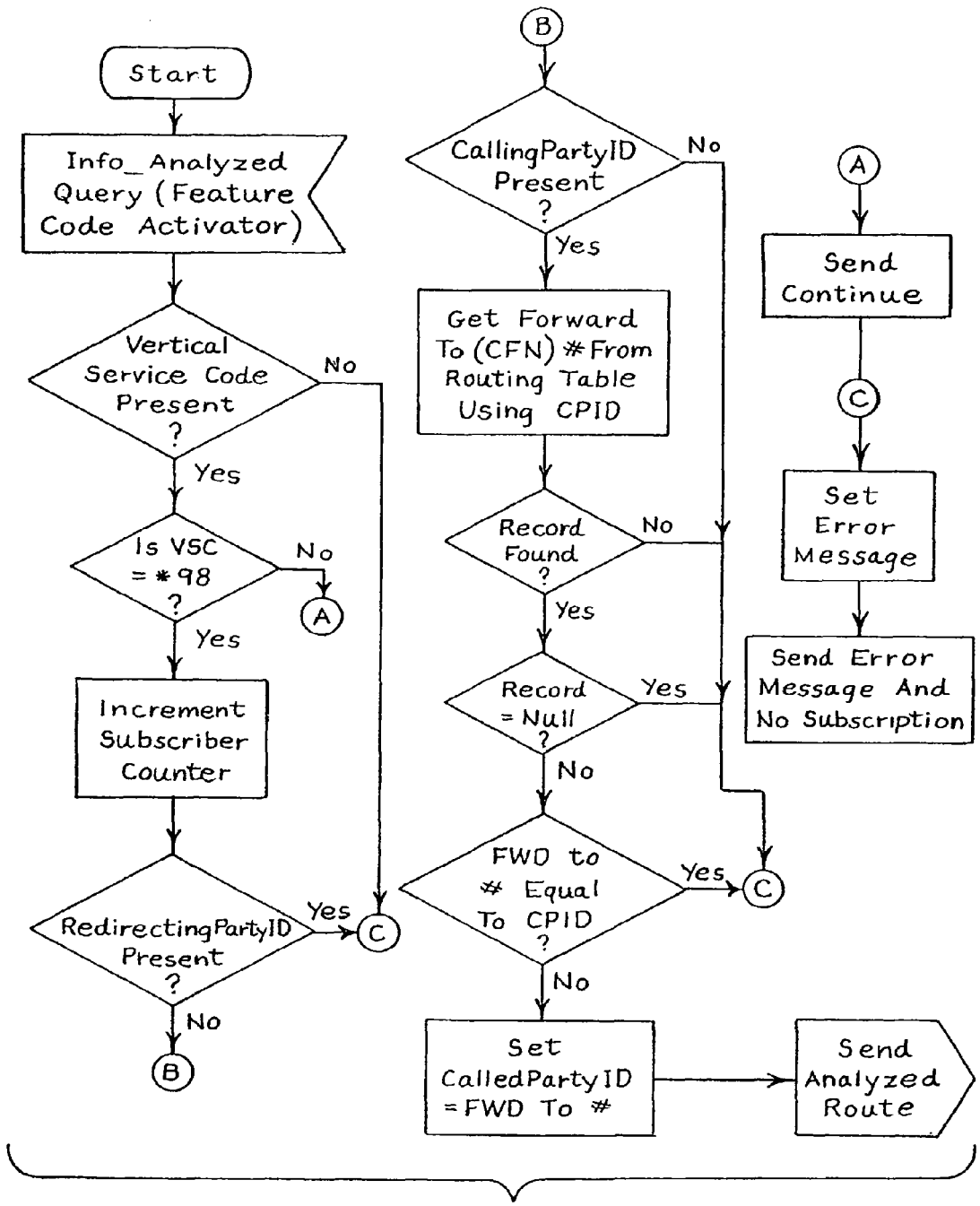

FIGS. 3A-B show a flow chart that describes a method of accessing messaging services using a star code access code. The method described in FIGS. 3A-B are preferably performed using the messaging services system described in FIG. 2 in which the supplementary services processor 50 includes the AIN SCP; the supplementary service processor 30 is an SSP and the router 22 is an STP.

The flow charts in FIGS. 3A and 3B are methods that are preferably performed by the central office switch 20*a* when the customer at CPE 10*a* uses the star code access service. The method begins when the customer places the CPE 10*a* off-hook at step 102. When the dial tone is present at step 104, the customer dials the sequence of digits selected by the service provider as the star code access code (e.g. *98). The SSP receives the dialed digits at step 106 and encounters a PODP trigger at step 108.

In response to the PODP trigger, the SSP connects to the SCP for instructions. At step 110, the SCP analyzes the sequence that caused the PODP trigger (i.e. *98) and the caller's number to determine if the caller subscribes to the star code access service. The SCP analyzes the information according to the method described by the flow chart in FIG. 3B.

As shown in FIG. 3B, the SCP begins a database query at step 130. As discussed with reference to FIG. 2, the SCP may be queried by analyzing the service code 51 to determine if the star code access service is offered to the customers that are connected to the central office switch 20. The customer records for customers that use the star code access service are then analyzed to determine of the caller subscribes to the service. One of ordinary skill in the art will understand how to modify the flow charts in FIG. 3B to perform alternative embodiments, such as one in which the customer records 52 are analyzed to determine whether the star code access service is one of the services to which caller subscribes.

The SCP analyzes the sequence that caused the PODP trigger to determine if a vertical services code (VSC) is present at decision block 132. In a preferred embodiment, the SCP checks the service code 51 for a vertical services code. If no vertical services code is present, an error is processed at an error handler at step 154. An error message may be set at step 154 and sent to the central office switch 20 at step 156. The message may be linked to, or may include a recorded message that the central office switch 20 may send to the CPE 10.

If at step 132, the vertical services code is detected, it is checked to determine if it includes the star code access service at decision block 134. If the star code access service is not indicated, the SCP returns a "No subscription" message back to the SSP in the central office switch 20 at step 152.

If at step 134, the vertical services code includes the star access service, the subscriber counter 55 is incremented at step 136. If redirection information 53 is present, an error is processed at step 154.

At decision block 140, the query that is sent by the SSP in the central office switch 20 is checked to determine if it includes a caller identifier 24. In a preferred embodiment, the caller identifier 24 is the calling party identification, which is typically the caller's telephone number. If the query did not include the caller identification 24, an error condition is processed at step 154.

At step 142, the caller identifier 24 is used to retrieve a call forwarding number 60, or a "forward to number (#)." The call forwarding numbers are stored in a routing table 62. At decision block 144, if no record of a call forwarding number is found for the caller identifier 24, an error condition is processed at step 154. If a record is found, it is checked to determine if it contains a NULL at decision block 146. If a NULL is found, control is transferred to the error handler at step 154. At decision block 148, the call forwarding number is checked to see if it is the same as the caller identifier 24. If the call forwarding number is the same as the caller identifier 24, an error condition is processed at step 154. If a NULL or the caller identifier 24 is retrieved from the routing table 62, it may indicate a variety of status conditions. For example, it may indicate that the customer recently cancelled a star code access service, or that the customer recently cancelled the messaging service, or is in the process of switching messaging services.

If the messaging service call forwarding number is found in the routing table 62, a data element that may have been sent in the query from the SSP, such as a called party identifier, may be set to the call forwarding number at step 150. The call forwarding number is sent to the SSP as the analyzed route at step 158.

Referring back to FIG. 3A, a subscription is found at decision block 112 when the analyzed route returns from step 158 with a call forwarding number. When an error is detected at step 110, no subscription was found. Error conditions are sent to the error handler at step 114. The error handler preferably processes the error by announcing the error to the caller at step 116 by playing for example, a recorded error message.

If a subscription is found at decision block 112, the SSP sends the call forwarding number to the STP. The STP routes the call to the messaging service at step 120.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

The invention claimed is:

1. A system for enabling a user to access a voicemail service comprising:
    a network element in communication with a customer premises equipment, the network element comprising:
        a supplementary service processor operative to:
            receive a sequence of characters from the customer premises equipment, wherein the sequence of characters is a predetermined dialing sequence;
            associate the customer premises equipment with a caller identifier;
            generate a query to a supplementary service database in response to receiving the sequence of characters to determine whether the network element supports a supplementary service and to determine whether a user has access to a voicemail service based on the caller identifier; and
            receive a call forwarding number from the supplementary service database when the network element supports the supplementary service and the user has access to the voicemail service;
    wherein the first network element is operative to connect the customer premises equipment with the voicemail service in response to receiving the call forwarding number and the caller identifier; and
    wherein the network element is further operative to prevent access to the voicemail service in response to a determination that the user does not have access to the voicemail service based on the caller identifier.

2. The system of claim 1, wherein the network element is a central office switch.

3. The system of claim 1, wherein the network element further comprises:
    an error handler for sending an error message to the customer premises equipment in response to a determination that the user does not have access to the voicemail service.

4. The system of claim 1, wherein the sequence of characters comprises a '*' star character.

5. The system of claim 1, wherein the supplementary service processor generates the query when the sequence of characters is a predetermined n-character messaging sequence, where n<7.

6. The system of claim 5, wherein n=3.

7. The system of claim 6, wherein the 3-character messaging sequence includes a first '*' star character followed by a two number sequence.

8. The system of claim 1, wherein the n-character messaging sequence comprises the sequence *98.

9. The system of claim 1, wherein the supplementary service processor further comprises:
    a routing table for storing a call forwarding number for a user that has access the voicemail service.

10. A method for controlling a user's access to a voicemail service, the method comprising:
    receiving a sequence of characters, wherein the sequence of characters is a predetermined dialing sequence, with a supplementary service processor, transmitted from customer premises equipment; associating the customer premises equipment with a caller identifier; generating, with the supplementary service processor, a query to a supplementary service database in response to receiving the sequence of characters to determine whether a network element supports a supplementary service and to determine whether a user has access to a voicemail service based on the caller identifier;
    receiving a call forwarding number from the supplementary service database when the network element supports the supplementary service and the user has access to the voicemail service; and
    connecting the customer premises equipment with the voicemail service in response to receiving the call forwarding number and the caller identifier; and
    wherein the network element is further operative to prevent access to the voicemail service in response to a determination that the user does not have access to the voicemail service based on the caller identifier.

11. The method of claim 10, wherein the network element is a central office switch.

12. The method of claim 10, wherein the supplementary service processor generates the query when the sequence of characters is a predetermined n-character messaging sequence, where n<7.

13. The method of claim 12, wherein n=3.

14. The method of claim 13, wherein the 3-character messaging sequence includes a first '*' star character followed by a two number sequence.

15. A non-transitory computer-readable storage medium comprising a set of instructions for controlling a user's access to a voicemail service, the set of instructions to direct a processor to perform acts of:

receiving a sequence of characters transmitted from customer premises equipment, wherein the sequence of characters is a predetermined dialing sequence;

associate the customer premises equipment with a caller identifier;

generating a query to a supplementary service database in response to receiving the sequence of characters to determine whether a network element supports a supplementary service and to determine whether a user has access to a voicemail service based on the caller identifier;

receiving a call forwarding number from the supplementary service database when the network element supports the supplementary service and the user has access to the voicemail service; and connecting the customer premises equipment with the voicemail service in response to receiving the call forwarding number and the caller identifier; and wherein the and the network element is further operative to prevent access to the voicemail service in response to a determination that the user does not have access to the voicemail service based on the caller identifier.

16. The non-transitory computer-readable storage medium of claim 15, wherein the network element is a central office switch.

17. The non-transitory computer-readable storage medium of claim 15, wherein the query to the supplementary service database is generated when the sequence of characters is a predetermined n-character messaging sequence, where n<7.

* * * * *